(12) United States Patent
Kimura et al.

(10) Patent No.: US 11,065,656 B2
(45) Date of Patent: Jul. 20, 2021

(54) METHOD AND APPARATUS FOR PRODUCING A PRODUCT

(71) Applicant: SHINKO TECNOS CO., LTD., Ichinorniya (JP)

(72) Inventors: Mamoru Kimura, Ichinomiya (JP); Kentaro Nagasawa, Yokohama (JP); Tadashi Nakamura, Tokyo (JP)

(73) Assignee: SHINKO TECNOS CO., LTD., Ichinomiya (JP)

( * ) Notice: Subject to any disclaimer, the term of this patent is extended or adjusted under 35 U.S.C. 154(b) by 221 days.

(21) Appl. No.: 16/313,839

(22) PCT Filed: Jun. 27, 2016

(86) PCT No.: PCT/JP2016/069052
§ 371 (c)(1),
(2) Date: Dec. 27, 2018

(87) PCT Pub. No.: WO2018/002997
PCT Pub. Date: Jan. 4, 2018

(65) Prior Publication Data
US 2019/0151911 A1    May 23, 2019

(51) Int. Cl.
*B09B 3/00* (2006.01)
*B09B 5/00* (2006.01)
*C10L 5/44* (2006.01)

(52) U.S. Cl.
CPC .............. *B09B 3/0091* (2013.01); *B09B 3/00* (2013.01); *B09B 5/00* (2013.01); *C10L 5/445* (2013.01); *C10L 2290/08* (2013.01); *C10L 2290/148* (2013.01); *C10L 2290/32* (2013.01); *C10L 2290/50* (2013.01); *C10L 2290/54* (2013.01); *C10L 2290/545* (2013.01); *Y02A 40/20* (2018.01); *Y02E 50/10* (2013.01); *Y02E 50/30* (2013.01)

(58) Field of Classification Search
None
See application file for complete search history.

(56) References Cited

U.S. PATENT DOCUMENTS

| | | | | |
|---|---|---|---|---|
| 5,021,077 A * | 6/1991 | Moore | ............... | C05F 11/00 71/17 |
| 5,556,445 A | 9/1996 | Quinn et al. | | |
| 5,670,677 A | 9/1997 | Ponsati Obiols et al. | | |
| 5,782,982 A * | 7/1998 | Farone | ............... | C08B 15/02 127/37 |
| 6,110,323 A * | 8/2000 | Marsland | ............... | C05F 11/00 127/34 |
| 6,273,927 B1 * | 8/2001 | Yang | ............... | C05D 3/02 71/11 |
| 6,699,708 B1 * | 3/2004 | Muller | ............... | C12M 29/06 435/262 |
| 8,685,685 B2 * | 4/2014 | Retsina | ............... | C12P 7/16 435/165 |
| 2003/0121851 A1 * | 7/2003 | Lee, Jr. | ............... | C12M 45/04 210/603 |
| 2004/0033290 A1 * | 2/2004 | Matano | ............... | C05F 11/00 426/52 |
| 2005/0244934 A1 * | 11/2005 | Foody | ............... | C05D 1/02 435/101 |
| 2010/0092652 A1 * | 4/2010 | Ogura | ............... | C10B 49/04 426/615 |
| 2010/0136629 A1 * | 6/2010 | Li | ............... | C05F 7/00 435/72 |
| 2015/0101242 A1 * | 4/2015 | Hill | ............... | C08K 13/02 44/556 |
| 2016/0145164 A1 * | 5/2016 | Palmer | ............... | C05G 3/40 504/101 |
| 2017/0107159 A1 * | 4/2017 | Hepner | ............... | C05F 5/008 |

FOREIGN PATENT DOCUMENTS

| | | |
|---|---|---|
| CN | 102906502 A | 1/2013 |
| JP | 8-507756 A | 8/1996 |
| JP | 2002-113444 A | 4/2002 |
| JP | 2009-291092 A | 12/2009 |
| JP | 2010-270320 A | 12/2010 |
| JP | 2013-230142 A | 11/2013 |
| WO | WO 2004/060854 A1 | 7/2004 |
| WO | WO 2007/131152 A1 | 11/2007 |
| WO | WO 2011/065710 A2 | 6/2011 |

OTHER PUBLICATIONS

Communication from the Indonesian Patent Office dated Jul. 27, 2020, in a counterpart Indonesian application No. PID201811249.
International Search Report and Written Opinion, Issued by International Searching Authority in corresponding International Application No. PCT/JP2016/069052, dated Jul. 26, 2016 (PCT/ISA/210 & PCT/ISA/237).

* cited by examiner

Primary Examiner — Wayne A Langel
(74) Attorney, Agent, or Firm — Arent Fox LLP

(57) ABSTRACT

The present invention relates to a method and apparatus for producing a product by hydrolyzing a raw material containing vegetable waste comprising, a hydrolysis treatment step of subjecting the raw material to a hydrolysis treatment with steam by a hydrolysis treatment apparatus, a washing step of washing the hydrolyzed raw material with a washing liquid by a cleaning apparatus, and a solid-liquid separation step of separating the washed raw material into a solid component and a liquid component by a solid-liquid separation apparatus, wherein at least one of the solid content or the liquid con-tent is used as the product.

10 Claims, No Drawings

METHOD AND APPARATUS FOR PRODUCING A PRODUCT

CROSS-REFERENCE TO RELATED APPLICATIONS

This application is a 35 U.S.C. § 371 National Phase of PCT Application No. PCT/JP2016/069052, filed Jun. 27, 2016. The disclosures of these prior applications are hereby incorporated by reference herein.

TECHNICAL FIELD

The present invention relates to a method and apparatus for producing a product.

BACKGROUND ART

Traditionally, vegetable waste such as (a) agricultural crops and agricultural products processed residue—e.g. waste vegetables due to overproduction, vegetable scraps, cut vegetable scraps, soybean strained lees, logging branches of street trees, thinned wood, sawdust, straw, rice straw, or chaff—(b) beverage residue—e.g. shochu strained lees, sake strained lees, fruit wine strained lees, soy sauce strained lees, tea leaves, or fruit juice strained lees—or (c) EFB (Empty Fruit Bunch, Empty Fruits) which is the leftovers after palm oil has been pressed from the fruit from oil palms, has been disposed of by methods such as drying, incineration, and as landfill.

In recent years, in order to recycle these vegetable wastes, a method for producing an organic acid by hydrolyzing a vegetable waste with an enzyme has been proposed (see Patent Document 1).

PRIOR ART DOCUMENT

Patent Document

[Patent Document 1] Japanese Unexamined Patent Publication No. 2013-230142

DISCLOSURE OF INVENTION

Summary of the Invention

However, in the manufacturing method described in Patent Document 1, because the hydrolyzing treatment of the vegetable waste uses enzymes, the hydrolysis treatment step takes a long time.

Therefore, the present invention has been made in view of the above problem, an object of the present invention is to provide a method and apparatus capable of producing a product from vegetable waste materials in a short time.

One embodiment according to the present invention is a method for producing a product by hydrolyzing a raw material containing vegetable waste comprising, a hydrolysis treatment step of subjecting the raw material to a hydrolysis treatment with steam, a washing step of washing the hydrolyzed raw material with a washing liquid, and a solid-liquid separation step of separating the washed raw material into a solid component and a liquid component, wherein at least one of the solid content or the liquid content is used as the product.

In another embodiment, after the separation step, the washing step may be repeated, and the separation step and the washing step may be repeated a plurality of times.

In another, the washing liquid in the washing step may be water.

In another, the method may include a drying step of drying the solid component.

In another, the method may include a molding step of pelletizing the solid content.

In another, a biomass fuel may be produced from the solid component.

In another, a liquid fertilizer may be produced from the liquid component.

Another embodiment of the present invention is an apparatus for producing a product by hydrolyzing a raw material containing a vegetable waste comprising, a hydrolysis treatment apparatus that hydrolyzes the raw material steam, a cleaning device that washes the hydrolyzed raw material with a washing liquid, and a solid-liquid separating apparatus that separates the washed raw material into solid component and a liquid component.

According to the present invention, providing a method and apparatus capable of producing a product from vegetable waste materials in a short time is possible.

DETAILED DESCRIPTION OF PREFERRED EMBODIMENTS OF THE INVENTION

Hereinafter, as an embodiment of the present invention, a method and apparatus for producing a product will be described.

The production method of this product is to produce a product by hydrolyzing a raw material containing a vegetable waste, and includes a hydrolysis treatment step, a washing step, and a solid-liquid separation step. Here, at least one of either biomass fuel or liquid fertilizer is produced as a product, using EFB as the vegetable waste, i.e. the raw materials, but is not limited to this and such materials like corn or banana may be used. However, because EFB is the leftovers after palm oil has been pressed from the fruit of oil palms, it is inexpensive and available in large quantities.

(Raw Material Pretreatment Process)

In the case of producing a product as it is in the oil mill, the EFB may remain in its shape after the oil extraction, but if transporting to another place, if necessary, the EFB may be crushed to a size from about 100 mm to 10 mm by a crushing means.

(Raw Material Input Step)

The EFB is introduced into a processing container of the hydrolysis treatment apparatus. At this time, the moisture regulating material may be simultaneously introduced together with the EFB. As the moisture regulating material, in addition to having water absorption properties, an adsorbent material capable of adhering particles such as harmful heavy metal ions eluted by the hydrolysis treatment or the like may be used. The adsorbent material may be an inorganic adsorbent material, but is preferably an organic adsorbent material.

When the EFB is introduced into the processing container, the EFB may be agitated by rotating a stirring means in the processing container. The operation of the stirring means may be either continuous or intermittent, but the rotation direction is preferably controlled by a timer so that the forward rotation and the reverse rotation are repeated at predetermined time intervals.

(Pressure Raising Step)

When the processing container is closed, steam is supplied from a steam source to the inside of the processing container, and the inside of the processing container is pressurized and heated to a predetermined pressure and temperature. At this time, the internal pressure of the processing container is about 1.8 MPa to 3.0 MPa, and the internal temperature is about 180° C. to 230° C.

(Hydrolysis Treatment Step)

When the interior of the processing container is maintained at a predetermined pressure and temperature, because EFB is a vegetable organic matter, hydrolyzation begins to occur. When a predetermined time, for example 30 minutes, has elapsed from the start of supplying the steam, because the hydrolysis treatment of the raw material has been almost completed, the supply of steam is stopped and the hydrolysis treatment is terminated. By this hydrolysis treatment step, the EFB becomes hydrolyzed. The time of the hydrolysis treatment is appropriately changed according to the treatment amount or the like but about 30 minutes to 2 hours is sufficient.

When the EFB is subjected to hydrolysis treatment, polymers such as cellulose are reduced in molecular weight. That is, the plant fiber (the cell wall and the cell membrane of the plant) becomes fragile or destroyed. In addition, elements such as potassium, chlorine and chlorine from the plant cells are eluted into the liquid.

Note that the EFB may be stirred by rotating the stirring means in the same manner as in the raw material input step. The operation of the stirring means may be either continuous or intermittent, but the rotation direction is preferably controlled by a timer so that the forward rotation and the reverse rotation are repeated at predetermined time intervals.

(Steam Exhaust Step)

After completion of the hydrolysis treatment step, for about 30 minutes to 60 minutes, the pressure inside the processing container is released to about atmospheric pressure (0.1 MPa).

(Product Discharge Step)

In the EFB hydrolyzed by the hydrolysis treatment apparatus, the liquid component is easily removed and discharged from the treatment container with a simple filter such as a metal mesh. Note that the EFB may contain some moisture. At this time, the EFB before the hydrolysis treatment contained 32 g/Kg (3.24% DM) of potassium, but after this hydrolysis treatment, about 80% is eluted into the liquid component. That is, the EFB after hydrolysis contains only 7 g/Kg (0.7% DM) potassium.

Conversely, 25 g/Kg (2.53% DM) of potassium has been transferred to the simplified separated liquid component. Since this liquid component contains a large amount of potassium, it can be used as is as a liquid fertilizer, or it can be used as a raw material for a liquid fertilizer.

(Washing Step)

Then, the discharged EFB is introduced into a washing apparatus, immersed in a washing liquid, and washed. The washing liquid may be water such as factory water or tap water, and using more than 5 times the volume of EFB with 10 times to 20 times the volume being preferable. The temperature of the washing liquid may be from room temperature to about 60° C. The washing time is appropriately changed according to the amount of treatment and the like, but about 15 to 30 minutes is sufficient.

Also by washing with this washing liquid, since potassium is eluted from the EFB, potassium is transferred to the washing liquid. At this time, about 2 g/Kg (0.2% DM) to 3 g/Kg (0.3% DM) of potassium is transferred to the washing liquid. In this way, because the washing liquid after washing also contains potassium, it can be used as a liquid fertilizer as is, or it can also be used as a raw material for components of liquid fertilizers.

(Separation Step)

The washed EFB is sent to a solid-liquid separating apparatus and separated (dewatered) into a solid component and a liquid component. Here, instead of a simple filter, a solid-liquid separating apparatus such as a screw conveyor type that pushes out (dehydrates) the liquid component from the EFB, which is a solid, is used (See, for example, Japanese Unexamined Patent Application Publication No. 2012-153790). In the case of the screw conveyor type, solid-liquid separation can be continuously performed, so that productivity is improved.

The solid component (EFB) after this separation process contains only 4 g/Kg (0.4% DM) to 2 g/Kg (0.2% DM) or less of potassium. Incidentally, when using only the processing method from the above-mentioned Japanese Unexamined Patent Application Publication No. 2012-153790, when the EFB is separated into a solid component and a liquid component, experiments have confirmed that 14 g/Kg (1.42% DM) of potassium is contained in the solid component (EFB).

Then, after the separation step of separating the liquid component from the EFB, repeat the washing step, and the separation step and the washing step may be repeated a plurality of times, for example two or three times.

(Drying Step)

Since the separated solid component contains some moisture, it is then dried in a drying apparatus. The drying temperature is about 120° C. to 200° C. In some cases, the molding step to be described next is performed first, and thereafter the drying step is performed.

(Molding Step)

The dried solid components are formed into pellets by a flat die pelletizer or the like which pelletizes the material. This pelleted solid component contains between 1 g/Kg (0.1% DM) to 3 g/Kg (0.3% DM) of potassium. The calorific value of these pellets is about 4300 Kcal (18.0 MJ)/Kg to 4500 Kcal (18.8 MJ)/Kg, and because the calorific value of general biomass fuel is approximately 4000 Kcal (16.7 MJ)/Kg to 4200 Kcal (17.5 MJ)/Kg, the calorific value is also improved.

In general, if biomass fuel contains a large amount of potassium, when burning it in a combustion furnace, it converts to slag, and the combustion furnace may become blocked and damaged. For this reason, EFB was rarely used as biomass fuel, but with regard to the embodied product of this manufacturing method, since pellets containing less potassium can be produced from EFB, they can be used as biomass fuel. In addition, even if coal and biomass fuels are mixed and burned in a combustion furnace, or even if biomass fuels alone are burned, problems do not occur.

On the other hand, regarding other elements and components found to be contained in the EFB before the hydrolysis treatment, was 0.7% DM of chlorine, 0.11% DM of sulfur, and 4.9% DM of ash, but after the hydrolysis treatment, it was also found that chlorine was reduced to 0.2% DM, sulfur to 0.04% DM, and ash to 0.9% DM. In this way, because the chlorine in the biomass fuel has been reduced, even when burned, hydrogen chloride, dioxin and the like are hardly generated.

As mentioned above, a method for producing a product according to embodiments of the present invention is a method in which a raw material containing vegetable waste is subjected to a hydrolysis treatment in order to produce a product, wherein the method includes a hydrolysis treatment step of subjecting the raw material to a hydrolysis treatment with steam, a washing step of washing the hydrolyzed raw material with a washing liquid, and a solid-liquid separation step of separating the washed raw material into a solid component and a liquid component, and wherein at least one of the solid component or the liquid component is used as the product.

In addition, the apparatus for producing a product according to the embodiment of the present invention is one for producing a product by hydrolyzing a raw material containing a vegetable waste, and includes a hydrolysis treatment apparatus for hydrolyzing the raw material with steam, a washing apparatus for washing the hydrolyzed raw material with a washing liquid, and a solid-liquid separating apparatus for separating the washed raw material into a solid component and a liquid component.

As a result, since raw materials containing vegetable waste are hydrolyzed by steam, solid or liquid products can be produced in a very short time. Hydrolyzing vegetable waste using enzymes would take about 0.5 to 5 days, but using a hydrolysis treatment with steam requires only about 30 minutes to 2 hours which saves time.

In the present embodiment, after the separation step, the washing step is repeated, and the separation step and the washing step are repeated a plurality of times. As a result, the product can be reliably washed. Further, the potassium in the solid component is eluted into the washing liquid through plurality of repeated washings, and the content of potassium in the solid component can be lowered.

In the present embodiment, the washing liquid in the washing step is water. This makes it possible to use inexpensive factory water or tap water because no special chemical solution is used for the product washing liquid.

In the present embodiment, a drying step of drying the solid component is included. As a result, the moisture (residual moisture) retained in the solid component is removed from the solid component together with potassium, so that the content of potassium in the solid component can be further lowered.

In the present embodiment, a molding step of pelletizing the solid component is included. This facilitates handling such as with the transportation of the solid components.
In the present embodiment, a biomass fuel is produced from the solid components. As a result, since the solid components contain almost no potassium, they can be used as a fuel.

In the present embodiment, the liquid fertilizer is produced from the liquid component. As a result, since the liquid component contains a large amount of potassium, it can be used as is as a liquid fertilizer, or as a raw material component for a liquid fertilizer.

Although preferred embodiments of the present invention have been described in detail, the present invention is not limited to the above-described embodiment, and various modifications and changes are possible within the scope of the gist of the present invention described in the claims.

The invention claimed is:

1. A method for producing a product by hydrolyzing a raw material containing vegetable waste comprising,
    a hydrolysis treatment step of subjecting the raw material to a hydrolysis treatment with steam,
    a washing step of washing the hydrolyzed raw material with a washing liquid, and
    a solid-liquid separation step of separating the washed raw material into a solid component and a liquid component,
    wherein at least one of the solid component or the liquid component is used as the product,
    the solid component separated from the raw material contains potassium at a concentration of 0.2% DM or less, and
    biomass fuel is produced from the solid component.

2. The method for producing a product according to claim 1, wherein after the separation step, the washing step is repeated, and the separation step and the washing step are repeated a plurality of times.

3. The method for producing a product according to claim 1, wherein the washing liquid in the washing step is water.

4. The method for producing a product according to claim 1, wherein the method includes a drying step of drying the solid component.

5. The method for producing a product according to claim 1, wherein the method includes a molding step of pelletizing the solid content.

6. The method for producing a product according to claim 1, wherein a liquid fertilizer is produced from the liquid component.

7. The method for producing a product according to claim 2, wherein the method includes a drying step of drying the solid component.

8. The method for producing a product according to claim 2, wherein the method includes a molding step of pelletizing the solid component.

9. The method for producing a product according to claim 4, wherein the method includes a molding step of pelletizing the solid component.

10. The method for producing a product according to claim 7, wherein the method includes a molding step of pelletizing the solid component.

* * * * *